United States Patent
Samarasooriya et al.

(10) Patent No.: US 9,143,774 B2
(45) Date of Patent: *Sep. 22, 2015

(54) METHOD AND APPARATUS FOR TELEVISION BAND PILOT SENSING

(71) Applicant: Wi-LAN, Inc., Ottawa (CA)

(72) Inventors: Vajira Samarasooriya, Ottawa (CA); Daniel Payer, Rockland (CA); Jung Yee, Ottawa (CA)

(73) Assignee: WI-LAN, INC., Ottawa (CA)

( * ) Notice: Subject to any disclaimer, the term of this patent is extended or adjusted under 35 U.S.C. 154(b) by 0 days.

This patent is subject to a terminal disclaimer.

(21) Appl. No.: 14/339,268

(22) Filed: Jul. 23, 2014

(65) Prior Publication Data

US 2015/0009339 A1    Jan. 8, 2015

Related U.S. Application Data

(63) Continuation of application No. 13/030,749, filed on Feb. 18, 2011, now Pat. No. 8,823,806.

(51) Int. Cl.
| | |
|---|---|
| *H04N 17/02* | (2006.01) |
| *H04N 17/00* | (2006.01) |
| *H04N 5/50* | (2006.01) |
| *H04N 5/52* | (2006.01) |
| *H04L 25/03* | (2006.01) |
| *H04N 21/438* | (2011.01) |
| *H04N 21/61* | (2011.01) |

(52) U.S. Cl.
CPC ........ *H04N 17/004* (2013.01); *H04L 25/03828* (2013.01); *H04N 5/50* (2013.01); *H04N 5/52* (2013.01); *H04N 21/4383* (2013.01); *H04N 21/6131* (2013.01)

(58) Field of Classification Search
None
See application file for complete search history.

(56) References Cited

U.S. PATENT DOCUMENTS

| | | | |
|---|---|---|---|
| 2004/0028123 A1 | 2/2004 | Sugar et al. | |
| 2006/0067354 A1 | 3/2006 | Waltho et al. | |
| 2006/0233269 A1* | 10/2006 | Bhushan et al. | 375/260 |
| 2007/0036232 A1* | 2/2007 | Hayashi | 375/260 |
| 2008/0165680 A1* | 7/2008 | Chang | 370/230 |
| 2008/0198948 A1 | 8/2008 | Tang | |
| 2008/0260052 A1* | 10/2008 | Hayashi | 375/260 |
| 2009/0102981 A1 | 4/2009 | Mody | |
| 2009/0325499 A1* | 12/2009 | Corke et al. | 455/67.11 |
| 2010/0035568 A1* | 2/2010 | Ghosh | 455/192.1 |
| 2010/0039925 A1* | 2/2010 | Bhushan et al. | 370/204 |
| 2010/0119016 A1* | 5/2010 | Ghosh | 375/340 |
| 2010/0134699 A1* | 6/2010 | Gao et al. | 348/731 |
| 2010/0309317 A1* | 12/2010 | Wu et al. | 348/180 |
| 2011/0045781 A1* | 2/2011 | Shellhammer et al. | 455/67.11 |
| 2011/0169965 A1* | 7/2011 | Kim et al. | 348/181 |
| 2011/0182338 A1* | 7/2011 | Li et al. | 375/224 |
| 2011/0235688 A1* | 9/2011 | Umeda | 375/216 |
| 2012/0057030 A1* | 3/2012 | Ghosh et al. | 348/192 |

OTHER PUBLICATIONS

International Search Report and Written Opinion issued on Jun. 8, 2012 in corresponding application No. PCT/CA2012/050068, in 7 pages.

* cited by examiner

*Primary Examiner* — Jefferey Harold
*Assistant Examiner* — Humam Satti
(74) *Attorney, Agent, or Firm* — Procopio, Cory, Hargreaves & Savitch LLP

(57) ABSTRACT

A DTV pilot sensor generates DTV pilot tone detection decisions associated with monitored television band channels without knowledge or estimation of a noise level of the monitored channel.

20 Claims, 5 Drawing Sheets

METHOD AND APPARATUS FOR TELEVISION BAND PILOT SENSING

RELATED APPLICATIONS

This application is a continuation of U.S. patent application Ser. No. 13/030,749 filed on Feb. 18, 2011, the contents of which are incorporated herein by reference in their entirety.

FIELD OF THE INVENTION

This invention relates in general to cognitive radio and to an efficient sensor for detecting digital television (DTV) pilot tones in the VHF/UHF television band channels.

BACKGROUND OF THE INVENTION

The opening of available television (TV) Band spectrum for usage by secondary TV band devices has created a need for efficient spectrum sensing mechanisms that can reliably detect available TV band white spaces to ensure that primary TV band users such as DTV broadcasters and wireless microphones are protected from interfering broadcasts by secondary TV Band device users.

Sensing for available white spaces in the VHF/UHF bands is vital to the operation of secondary TV Band devices. Protection of primary incumbent operators like digital television (DTV) stations and wireless microphone operators is designated by the United States Federal Communications Commission (FCC) and other federal authorities around the world. The DTV and wireless microphone sensing requirements set forth by the FCC are very stringent, requiring a sensing receiver sensitivity of −114 dBm for DTV and −107 dBm for wireless microphones. Detecting primary user broadcasts on VHF/UHF channels at the required sensing sensitivities is very challenging.

It has been suggested that all primary users of the TV Band spectrum broadcast a pilot tone at the DTV pilot position. Current methods of DTV pilot tone sensing rely on an accurate knowledge of received noise power. A signal energy contained within a narrow frequency band centered at the anticipated pilot tone position is compared against a threshold that is based on knowledge of, or an estimate of, the noise present in the channel. This technique is vulnerable to inaccuracies in the estimation of the noise, which often causes substantial degradation in performance. Furthermore, the presence of unwanted interfering tones within the DTV signal bandwidth can seriously affect DTV pilot tone detection performance.

There therefore exists a need for a method and apparatus that can detect the presence of DTV pilot tones at very low received signal strengths and in the presence of interference.

SUMMARY OF THE INVENTION

One aspect of the invention provides a method and apparatus that can reliably detect the presence of DTV pilot tones at low received signal strength and in the presence of interference.

One aspect of the invention provides a DTV pilot sensor, comprising a spectrum smoothing filter that smoothes a power spectrum of a received television band channel; pilot tone peak search logic that computes a peak signal power of a narrow frequency window centered around a designated DTV pilot position of the output of the spectrum smoothing filter; conditioned signal power estimation logic that estimates an average received signal power in a wide frequency window located in a designated data portion of the output of the spectrum smoothing filter; and pilot tone detection logic that compares an output of the pilot tone peak search logic with a product of an output the conditioned signal power estimation logic multiplied by a programmable power ratio to determine whether a DTV pilot tone has been detected.

A further aspect provides a method of sensing a DTV pilot tone in a television band, comprising tuning a radio frequency front end to a frequency associated with a television channel in the television band; smoothing a power spectrum of a received signal associated with the television channel; searching a narrow frequency window centered around a designated DTV pilot position of the smoothed power spectrum to locate a peak power of the narrow frequency window; estimating an average power of a wide frequency window located in a designated data portion of the smoothed power spectrum; and comparing the peak power of the narrow frequency window with a product of the average power of the wide frequency window multiplied by a programmable power ratio to determine whether a DTV pilot tone has been detected.

A further aspect provides a TV band device comprising pilot tone peak search logic that searches for a peak signal power in a narrow frequency window centered around a designated DTV pilot position of a smoothed power spectrum of a signal associated with a television band channel; conditioned signal power estimation logic that estimates an average received signal power in a wide frequency window located in a designated data portion of the smoothed power spectrum; and pilot tone detection logic that compares an output of the pilot tone peak search logic with a product of an output the conditioned signal power estimation logic multiplied by a programmable power ratio to determine whether a DTV pilot tone has been detected.

BRIEF DESCRIPTION OF THE DRAWINGS

Having thus generally described the nature of the invention, reference will now be made to the accompanying drawings, in which.

DETAILED DESCRIPTION

Embodiments of the invention provide a method and apparatus for detecting a DTV pilot tone in VHF/UHF television channels. DTV pilot tone detection logic searches for a pilot tone in a DTV pilot position of a smoothed power spectrum derived from a monitored down-converted UHF/VHF signal. The apparatus generates a DTV pilot tone detection decision associated with each monitored television channel.

Figure 1:
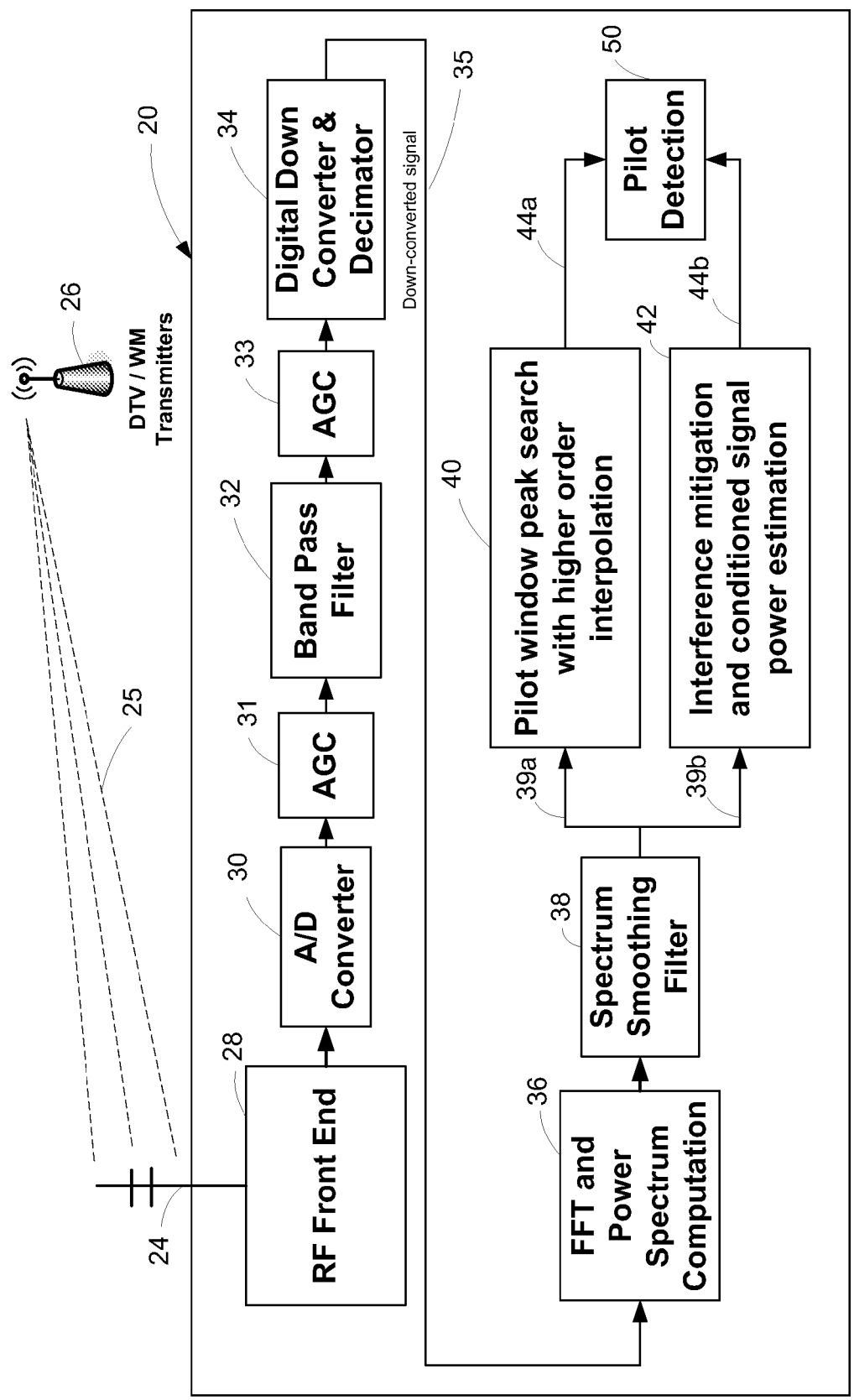
FIG. 1 is a functional block diagram of a television band device provisioned with a sensor in accordance with the invention for detecting pilot tones in television band channels.

FIG. 1 is a functional block diagram showing the functional blocks or modules of a television band device 20 provisioned with a DTV pilot tone sensor in accordance with the invention. As understood by those skilled in the art, the sensor components shown in FIG. 1 and described below may also be used for other receiver and/or signal processing functions in addition to the DTV pilot tone sensing performed by the television band device 20. It should further be understood by those skilled in the art that the DTV pilot tone sensing performed by the television band device 20 described below is performed in accordance with the provisions of the Advanced Television Systems Committee (ATSC) standard A/53 (ATSC Digital Television Standard, Parts 1-6, 2027). However, the methods described below can be adapted to other international television standards without departing from the scope of the invention.

The television band device 20 is equipped with a television band antenna 24, the structure and function of which is well known in the art. The antenna 24 receives television band signals 25 transmitted by Digital Television (DTV) transmitters, as well as other devices transmitting in the television band. The received signals are passed from the antenna 24 to one (or more) radio frequency (RF) front end 28 that is designed to selectively segregate one UHF/VHF channel at a time from the received signals. Then the RF front end 28 outputs a gain adjusted analog signal that it has down-converted to an intermediate frequency representation of the selected channel signal.

The analog down-converted signal output by the RF front end(s) 28 is passed to an analog-to-digital (A/D) converter 30, which samples the analog signal at a sampling rate of, for example, 100 MHz to convert the analog intermediate frequency to a digital signal. The digital signal is passed to an automatic gain controller (AGC) 31, which controls the amplitude of the digital signal in a manner well known in the art. The gain-controlled signal is passed to a band pass filter 32, which filters out low and high frequency components. The filtered signal is passed to a second AGC 33, which controls the amplitude of the band pass filtered signal. The output of the AGC 33 is passed to a digital down converter and decimator 34, which down converts and decimates the gain-controlled signal and outputs a down-converted signal 35. In accordance with one embodiment of the invention, the down-converted signal 35 is centered at 5.381 MHz, which corresponds to half the ATSC symbol rate. The down-converted signal 35 is received by a Fast Fourier Transform (FFT) and power spectrum computation section or module 36. The FFT and power spectrum computation section 36 processes the down-converted signal 35 and outputs a power spectrum of the down-converted signal as a serial data stream to a spectrum smoothing filter 38, which smoothes the power spectrum using a power spectrum smoothing algorithm. The power spectrum smoothing algorithm may be, for example, an exponential averaging algorithm that averages a current cycle output with a previous cycle average using predetermined weighting ratio(s). The serial output of the spectrum smoothing filter 38 is passed in parallel via a signal path 39a to pilot window peak search logic or module 40 and via signal path 39b to conditioned signal power estimation logic or module 42.

The pilot window peak search logic 40 searches for a peak received signal power within a specified window centered on the designated DTV pilot position, as will be explained below in more detail with reference to FIG. 3. The conditioned signal power estimation logic 42 estimates an average power of the conditioned signal within a second window located in a data portion of the frequency band of the VHF/UHF channel, as will be explained below with reference to FIG. 4.

Output of the pilot window peak search logic 40 is passed via signal path 44a to pilot tone detection logic or module 50. Output of the conditioned signal power estimation logic 42 is passed via signal path 44b to the pilot tone detection logic 50. The pilot tone detection logic 50 determines the presence or absence of a DTV pilot tone by comparing the peak received signal power computed within the narrow window with the average conditioned signal power level estimated in the second window to determine a ratio of the two signal powers, and comparing the ratio to a predetermined threshold, as will be explained below with reference to FIG. 5.

Figure 2:
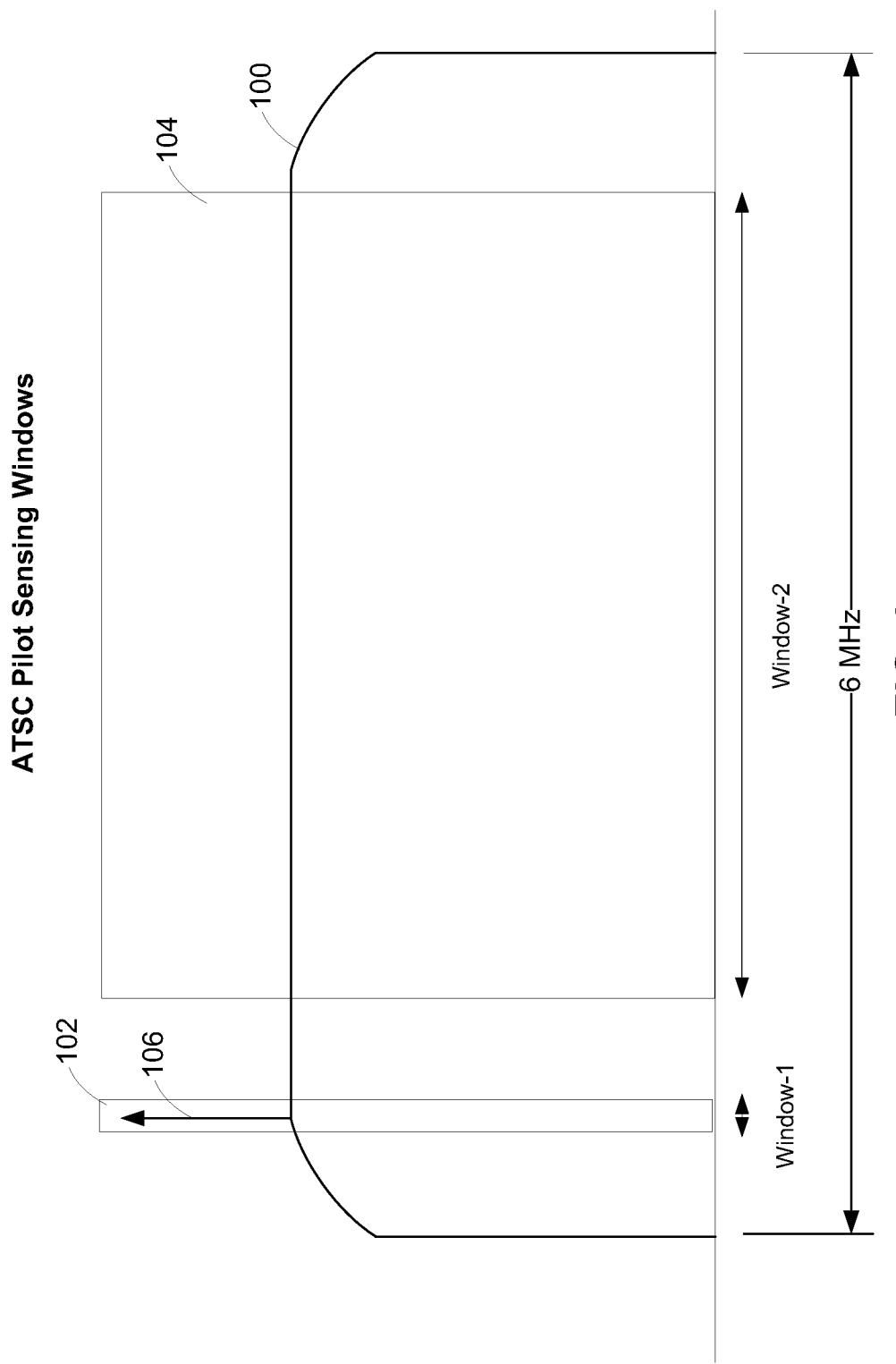
FIG. 2 is a schematic diagram of ATSC sensing windows in accordance with one embodiment of the invention.

FIG. 2 is a schematic diagram of one embodiment of the DTV pilot tone sensing windows used by the TV band device 20 shown in FIG. 1. DTV pilot tone sensing window-1 (W-1) 102 is a narrow window having a width in frequency of $\Delta f_1$ and FFT indices $[n_1, n_2]$. W-1 is centered in the 6 MHz DTV signal 100 at the designated frequency location for the DTV pilot tone 106. In one embodiment $\Delta f_1$ is about 30-40 KHz, but may be in a range of 30-60 KHz. The DTV sensing window-2 (W-2) 104 has a width in frequency of $\Delta f_2$ and respective FFT indices $[n_3, n_4]$. The DTV sensing W-2 104 is located in the DTV data portion of the 6 MHz channel 100. In one embodiment, $\Delta f_2$ is about 2-4.5 MHz. The width in frequency and position of DTV sensing window-2 (W-2) 104 is largely a matter of design choice though W-2 may not overlap the bandwidth occupied by window-1 (W-1) 102.

Figure 3:
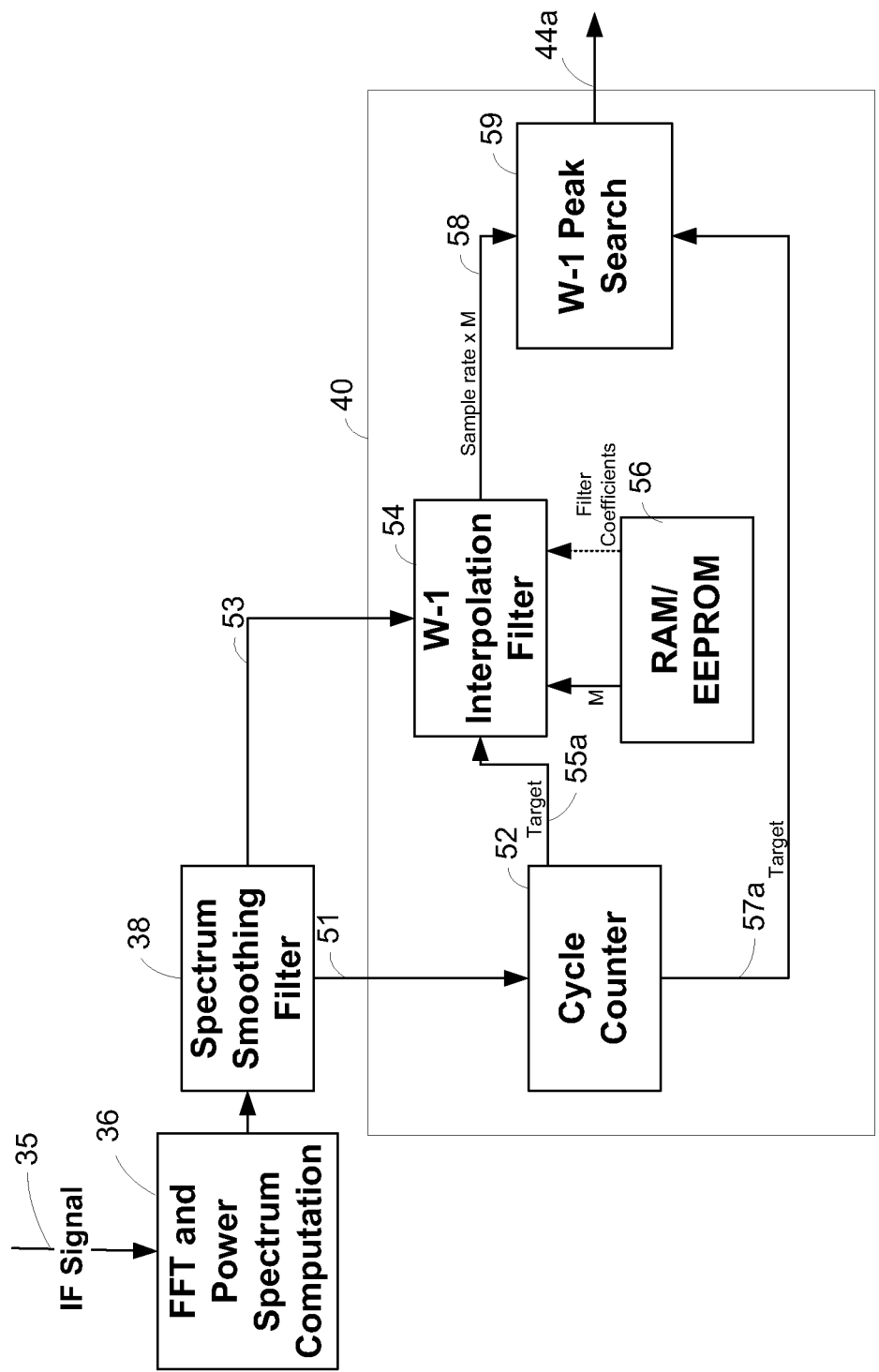
FIG. 3 is a functional block diagram of an exemplary embodiment of the pilot window peak search with higher order interpolation function of the sensor shown in FIG. 1.

FIG. 3 is a functional block diagram showing the functional blocks or modules of one embodiment of the pilot window peak search module 40 shown in FIG. 1. As will be understood by those skilled in the art, this embodiment is exemplary only and other ways of implementing this moule are within the grasp of the skilled artisan. As explained above, the down-converted signal 35 is processed by the FFT and power spectrum computation section 36, which outputs respective FFT bin values to the spectrum smoothing filter 38. The spectrum smoothing filter smoothes the FFT outputs using, for example, the exponential averaging algorithm. At the beginning of each FFT cycle, the spectrum smoothing filter 38 outputs a start-of-cycle signal over connection 51 to a cycle counter 52, which increments a cycle count and compares the cycle count to at least one programmable variable. In one embodiment two programmable variables, $N_{av}-1$ and $N_{av}$, are used and $N_{av}$ is set to 1024. Concurrently, the spectrum smoothing filter outputs the smoothed power spectrum values via connection 53 to a W-1 interpolation filter 54, which selects the smoothed power spectrum values associated with FFT indices $[n_1, n_2]$. The W-1 interpolation filter 54 is a finite impulse response (FIR) lowpass filter, or an infinite impulse response (IIR) lowpass filter, that can estimate power peaks that occur between data samples. In one embodiment of the invention, the W-1 interpolation filter is passive until it receives a flag from the cycle counter 52 via connection 55a indicating that the next cycle of outputs from the spectrum smoothing filter 38 is to be processed using a programmable interpolation factor M and programmable filter coefficients (filter tap weights), respectively retrieved from random access memory (RAM) or electrically erasable programmable read only memory (EEPROM) 56. The interpolation factor M is used by the W-1 interpolation filter 54 to increase the sample rate of the output of the spectrum smoothing filter 38, i.e. up-sample the output of the spectrum smoothing filter 38. In one embodiment of the invention, M=2. In another embodiment of the invention, M=4, though other interpolation factors may also be used. The W-1 interpolation filter coefficients (filter tap weights) are used to shape the up-sampled outputs of the smoothing filter 39 in a manner known in the art.

As explained above, the W-1 peak search logic or module 59 is passive until it receives the flag via connection 57a from the cycle counter 52 indicating that current outputs from the spectrum smoothing filter 38 are to be processed. Depending on the computational speed of the TV band device 10, that flag may be the $N_{av}$-1 or the $N_{av}$ flag. The W-1 peak search logic 59 then examines the interpolated outputs 58 in the cycle for a distinct single peak power level. If a distinct single peak power level is detected, that power level is output via connection 44a to the pilot tone detection logic 50 (FIG. 1). If a distinct single peak power level is not detected, any one of the peak power levels is selected and output via the connection 44a to the pilot tone detection logic 50.

Figure 4:
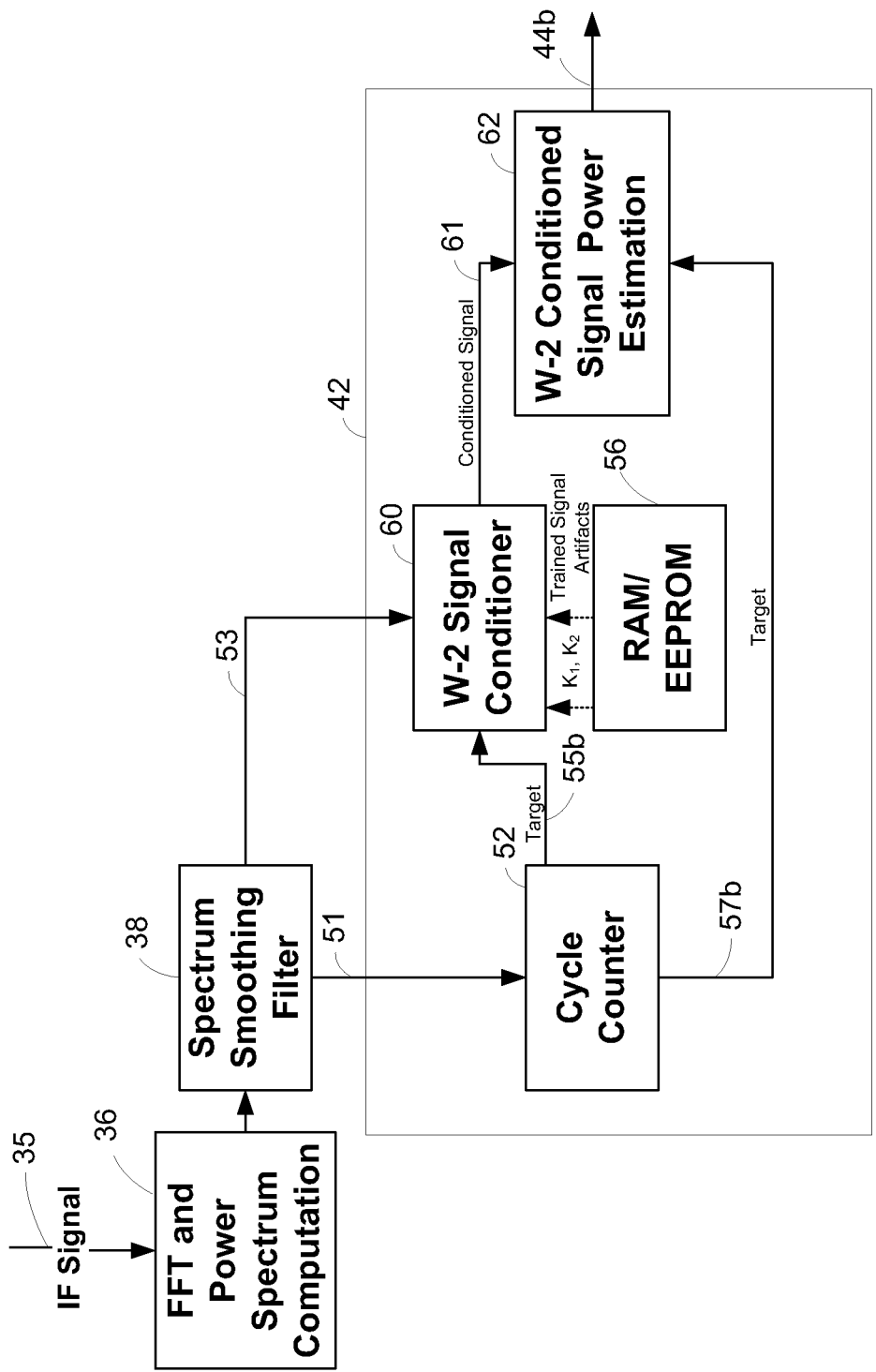
FIG. 4 is a functional block diagram of an exemplary embodiment of the interference mitigation and conditioned signal power estimation function of the sensor shown in FIG. 1.

FIG. 4 is a functional block diagram showing the functional blocks or modules of one embodiment of the interference mitigation and conditioned signal power estimation logic 42 of FIG. 1. In the same way as explained above with reference to FIG. 3, the cycle counter 52 counts FFT cycles and outputs the target flag via connection 55b to W-2 signal conditioner 60, which includes logic to set signal conditioning limits on receipt of the target flag. The signal conditioner logic sets the signal conditioning limits in any one or more of various ways. For example:

a programmable constant $K_1$ indicating the number of highest power levels and a programmable constant K2 indicating the number of lowest power levels to be eliminated from the W-2 power levels;

a programmable constant L indicating a number of median power levels to be used for signal conditioning (i.e., the median power level is computed, and the L power levels closest to the median power level are output as the conditioned signal, and all other power level values are eliminated or ignored).

the target cycle output is examined and dynamic high and low hard power limits are set using knowledge about the expected power level of the ASTC data portion of a 6 MHz TV channel to reduce an impact of high power levels and/or low power levels on an average power level of the conditioned signal;

trained signal artifacts are used to condition the W-2 signals. Trained signal artifacts are known device-generated interfering frequencies and/or channel-dependent interfering tones that are identified and their frequencies are stored during an initial and/or long-term training process.

It should be understood that the signal conditioning logic or module of signal conditioner 60 may be programmed to use any two or more of these signal conditioning techniques to condition signals in the target cycle after the signal conditioning limits are set. It should also be understood that the limit setting and the signal conditioning can be accomplished in the same cycle if the computing cycles required to do so permit it. In either event, in the target cycle(s), the signal conditioning limits are applied to the outputs of the spectrum smoothing filter by the signal conditioning logic and the conditioned signal 61 is passed to the W-2 conditioned signal power estimation logic or module 62, which estimates an average power level of the conditioned signal 61. The average conditioned signal power level is passed via connection 44b to the pilot tone detection logic 50, which makes a pilot tone detection decision, as will be explained below with reference to FIG. 5.

Figure 5:
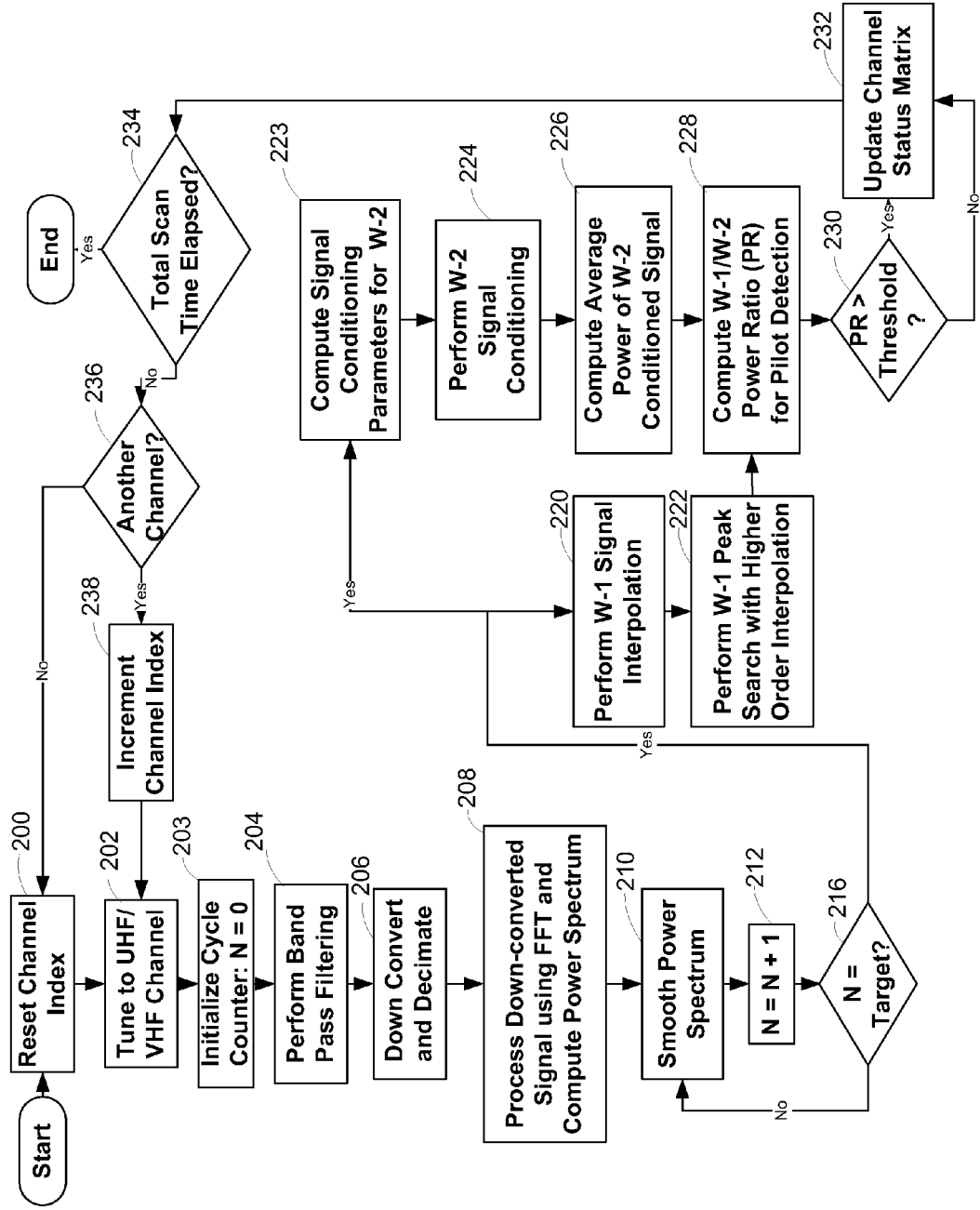
FIG. 5 is a flow chart of one embodiment of a DTV pilot sensing process used by the television band device shown in FIG. 1.

FIG. 5 is a flow chart of one embodiment of a sensing process implemented by the DTV pilot sensor of the television band device 20 shown in FIG. 1. The process begins by setting (200) a channel index to an initial starting channel number in a stored list of channels to be scanned. As explained above, the RF front end 28 is tuned (202) to a first UHF/VHF channel in the channel index, and the cycle counter 52 is initialized (203). The received signal is band pass filtered (204), down converted and decimated (206), and processed (208) by the FFT and power spectrum computation section 36. The power spectrum output by the FFT and power spectrum computation section 36 is smoothed (210) by the spectrum smoothing filter 38, which outputs the smoothed power spectrum. The smoothed power spectrum is continuously output to the DTV pilot window peak search logic 40 and the conditioned signal power estimation logic 42, but that output is not processed until a predetermined number of cycles of the power spectrum outputs have been averaged by the spectrum smoothing filter 38, as will be explained below in more detail. Consequently, at the beginning of each power spectrum output cycle it is determined (212) if a current number N of cycles of the power spectrum outputs averaged by the spectrum smoothing filter 38 is equal to the pre-programmed target ($N_{av}$). If not, the cycle counter continues to be incremented with each smoothed power spectrum output cycle until N=Target, at which time the parallel processes of W-1 peak power searching and W-2 signal conditioning parameter computation and conditioned signal power estimation is begun.

Subsequently, the W-1 interpolation filter 54 performs signal interpolation (220) as described above with reference to FIG. 3. W-1 peak search logic 59 then searches (222) for the maximum signal power level of W-1 102, as also described above with reference to FIG. 3. Concurrently, the W-2 signal conditioner 60 computes (223) the signal conditioning parameters as described above. The W-2 signal conditioner 60 applies (224) the signal limits computed at (223) to condition the W-2 signal outputs of the spectrum smoothing filter 38, and the W-2 conditioned signal power estimation logic 62 computes (226) the average power of the conditioned signal 61, as described above with reference to FIG. 4. The pilot tone detection logic 50, which receives the W-1 peak received signal power and W-2 estimated average power of the conditioned signal 61, then determines (228) a power ratio (PR) for pilot tone detection by comparing the W-1 peak power with a product of the W-2 average power multiplied by a predetermined power ratio ($\delta$). If it is determined (230) that the W-1 peak power is greater than the product, a positive pilot tone detection decision is output for the current sensing period; otherwise a negative pilot tone detection decision is output for the current sensing period. The predetermined power ratio $\delta$ is a programmable value set to keep the false alarm rate below a predetermined limit, for example 10%. In one embodiment of the invention, the predetermined power ratio $\delta=2$.

After the pilot tone detection decision is made (230), a channel status matrix is updated (232) by the pilot tone detection logic 50, which combines the current pilot tone detection decision with any previous pilot tone detection decisions for the current channel in a channel status matrix (not shown). It is then determined (234) if the designated total scan time (currently 30 seconds) has elapsed. If so, all channels have been scanned at least once and the process ends. If not, it is determined (236) if another channel remains to be scanned. If so, the channel index is incremented (238) to the next channel in the channel index to be scanned and the process repeats from (202). If not, the channel index is reset (200) again to the first UHF/VHF channel to be scanned and the process repeats from (202). As will be understood by those skilled in the art, the initial list of channels to be scanned may be refined based on the results of the first scan through the list. If strong DTV signals are sensed in some channels, those channels may be removed from the list of channels to be scanned. That affords more sensing time for the remaining channels to be scanned. Using the methods described above each of the channels in the channel scan index will normally be scanned several times before the total scan time has elapsed.

Those of skill in the art will appreciate that the various illustrative modules (sometimes also referred to as "logic" and "sections") and method steps described in connection with the above described figures and the embodiments disclosed herein can often be implemented as electronic hardware, software, firmware or combinations of the foregoing. To clearly illustrate this interchangeability of hardware and software, various illustrative modules and method steps have been described above generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a module or step is for ease of description. Specific functions can be moved from one module or step to another without departing from the invention.

Moreover, the various illustrative modules and method steps described in connection with the embodiments disclosed herein can be implemented or performed with hardware such as a general purpose processor, a digital signal processor ("DSP"), an application specific integrated circuit ("ASIC"), field programmable gate array ("FPGA") or other programmable logic device, discrete gate or transistor logic, discrete hardware components, or any combination thereof designed to perform the functions described herein. A general-purpose processor is hardware and can be a microprocessor, but in the alternative, the processor can be any hardware processor or controller, microcontroller. A processor can also be implemented as a combination of computing devices, for example, a combination of a DSP and a microprocessor, a plurality of microprocessors, one or more microprocessors in conjunction with a DSP core, or any other such configuration.

Additionally, the steps of a method or algorithm described in connection with the embodiments disclosed herein can be embodied directly in hardware, in a software module executed by a processor, or in a combination of the two. A software module can reside in computer or controller accessible on computer-readable storage media including RAM memory, flash memory, ROM memory, EPROM memory, EEPROM memory, registers, hard disk, a removable disk, a CD-ROM, or any other form of storage medium including a network storage medium. An exemplary storage medium can be coupled to the processor such the processor can read information from, and write information to, the storage medium. In the alternative, the storage medium can be integral to the processor. The processor and the storage medium can also reside in an ASIC.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent exemplary embodiments of the invention and are therefore representative of the subject matter which is broadly contemplated by the present invention. It is further understood that the scope of the present invention fully encompasses other embodiments and that the scope of the present invention is accordingly limited by nothing other than the appended claims.

We claim:

1. A television white spaces availability sensor, comprising:
   a pilot tone peak search module that computes a peak signal power of a narrow frequency window centered around a designated digital television (DTV) pilot position of the output of a signal and provides an output;
   a conditioned signal power estimation module that estimates an average received signal power in a wide frequency window located in a designated data portion of the signal and provides an output; and
   a tone detection module that compares the output of the pilot tone peak search module with a product of the output of the conditioned signal power estimation module multiplied by a programmable power ratio to determine whether a DTV pilot tone has been detected.

2. The sensor as claimed in claim 1 wherein the pilot tone peak search module further comprises an interpolation filter that up-samples and shapes the narrow frequency window outputs of the signal.

3. The sensor as claimed in claim 2 wherein the interpolation filter comprises a finite impulse response filter or an infinite impulse response filter.

4. The sensor as claimed in claim 1 further comprising a spectrum smoothing filter that smoothes a power spectrum of a received television band channel and provides an output;
   wherein the conditioned signal power estimation module further comprises a signal conditioner that uses signal power limits to condition the output of the spectrum smoothing filter to create a conditioned signal used to estimate the average received signal power within the wide frequency window.

5. The sensor as claimed in claim 4 wherein the signal conditioner computes the signal power limits.

6. The sensor as claimed in claim 5 wherein the signal conditioner examines the output of the spectrum smoothing filter and computes high and low hard power limits using knowledge about an expected power level of a data portion of the received television band channel to reduce an impact of high power levels and/or low power levels on an average power level of the conditioned signal.

7. The sensor as claimed in claim 4 wherein the signal conditioner retrieves the signal power limits from memory.

8. The sensor as claimed in claim 7 wherein the signal conditioner retrieves trained signal artifacts from the memory to condition the output of the spectrum smoothing filter.

9. The sensor as claimed in claim 8 wherein the signal conditioner retrieves one or more of known-device generated interfering frequencies; and channel-dependent interfering tones that are identified and their frequencies are stored during an initial and/or long-term training process.

10. The sensor as claimed in claim 4 wherein the signal conditioner retrieves certain ones of the signal power limits from memory and that computes certain ones of the signal power limits.

11. The sensor as claimed in claim 10 wherein the signal conditioner retrieves from the memory a programmable constant K1 indicating a number of highest power levels and a programmable constant K2 indicating a number of lowest power levels to be eliminated from the output of the spectrum smoothing filter; determines the K1 highest power levels, the K2 lowest power levels and that eliminates the respective K1 and K2 power levels from the output of the spectrum smoothing filter.

12. The sensor as claimed in claim 10 wherein the signal conditioner comprises a module that retrieves from memory a programmable constant L indicating a number of median power levels to be used for signal conditioning; computes a median power level of the smoothed power spectrum, and selects the L power levels closest to the median power of the output of the spectrum smoothing filter.

13. A method of sensing a digital television (DTV) pilot tone in a television band, comprising:
    tuning a radio frequency front end to a frequency associated with a television channel in the television band;
    searching a first frequency window centered around a designated DTV pilot position of a power spectrum of a received signal to locate a peak power of the narrow frequency window;
    estimating an average power of a second wider frequency window located in a designated data portion of the power spectrum; and
    comparing the peak power of the first frequency window with the estimated average power of the wider frequency window to determine whether a DTV pilot tone has been detected.

14. The method as claimed in claim 13 wherein comparing the peak power of the first frequency window with the estimated average power of the wider frequency window to determine whether a DTV pilot tone has been detected further comprises multiplying the estimated average power of the wider frequency window by a programmable power ratio and comparing that product with the peak power of the first frequency window.

15. The method as claimed in clam 13 wherein prior to searching the first frequency window the method further comprises using an interpolation filter to filter the power spectrum associated with the first frequency window.

16. The method as claimed in claim 15 wherein prior to estimating the average power of the wider frequency window, the method further comprises smoothing the power spectrum and conditioning the smoothed power spectrum associated with the wider frequency window using signal power limits.

17. The method as claimed in claim 16 wherein the signal power limits are computed.

18. The method as claimed in claim 17 wherein the smoothed power spectrum is examined and high and low hard signal power limits are computed using knowledge about an expected power level of a data portion of the television channel to reduce an impact of any one or more of high power levels; low power notches; and low power fading in the smoothed power spectrum.

19. The method as claimed in claim 16 wherein certain ones of the signal power limits are retrieved from memory and certain ones of the signal power limits are computed.

20. The method as claimed in claim 19 wherein the signal power limits retrieved from memory comprise a programmable constant K1 indicating a number of highest power levels and a programmable constant K2 indicating a number of lowest power levels to be eliminated from the smoothed power spectrum, and the method further comprises determining the K1 highest power levels, the K2 lowest power levels and eliminating the respective K1 and K2 power levels from the smoothed power spectrum.

\* \* \* \* \*